United States Patent
Yamada et al.

(10) Patent No.: US 9,070,388 B2
(45) Date of Patent: Jun. 30, 2015

(54) PLASMA PROCESSING METHOD

(75) Inventors: Kentaro Yamada, Shunan (JP); Takeshi Shimada, Hikari (JP); Takahiro Abe, Kudamatsu (JP)

(73) Assignee: HITACHI HIGH-TECHNOLOGIES CORPORATION, Tokyo (JP)

( * ) Notice: Subject to any disclaimer, the term of this patent is extended or adjusted under 35 U.S.C. 154(b) by 15 days.

(21) Appl. No.: 13/011,019

(22) Filed: Jan. 21, 2011

(65) Prior Publication Data

US 2012/0103933 A1 May 3, 2012

(30) Foreign Application Priority Data

Nov. 1, 2010 (JP) ................................. 2010-244920

(51) Int. Cl.
| | |
|---|---|
| C03C 15/00 | (2006.01) |
| C03C 25/68 | (2006.01) |
| C23F 1/00 | (2006.01) |
| B44C 1/22 | (2006.01) |
| H01L 21/302 | (2006.01) |
| H01L 21/461 | (2006.01) |
| G11B 5/31 | (2006.01) |
| C23F 4/00 | (2006.01) |
| H01F 41/34 | (2006.01) |

(52) U.S. Cl.
CPC ................ G11B 5/3163 (2013.01); C23F 4/00 (2013.01); H01F 41/34 (2013.01)

(58) Field of Classification Search
None
See application file for complete search history.

(56) References Cited

U.S. PATENT DOCUMENTS

| | | | |
|---|---|---|---|
| 7,060,194 B2 | 6/2006 | Kodaira et al. | |
| 2002/0133935 A1* | 9/2002 | Maekawa et al. | ........... 29/603.18 |
| 2004/0129361 A1* | 7/2004 | Chen et al. | ....................... 156/58 |
| 2005/0016957 A1 | 1/2005 | Kodaira et al. | |
| 2005/0019674 A1 | 1/2005 | Okubo et al. | |
| 2006/0051881 A1* | 3/2006 | Ditizio | .............. 438/3 |

FOREIGN PATENT DOCUMENTS

| | | | | |
|---|---|---|---|---|
| JP | 11-092971 | * | 4/1999 | ............... C23F 4/00 |
| JP | 11-92971 | | 4/1999 | |
| JP | 2005-42143 | | 2/2005 | |
| JP | 2009-80510 | | 4/2009 | |
| JP | 2010-49761 | | 3/2010 | |
| JP | 2010-049761 | * | 3/2010 | ............... G11B 5/31 |
| JP | 2010-152971 | | 7/2010 | |

OTHER PUBLICATIONS

Nakata, et al. Plasma Etching Characteristics of Chromium Film and its Novel Etching Mode, 1980, Journal of Vacuum Science and Technology, vol. 17, pp. 1351-1357.*

* cited by examiner

*Primary Examiner* — Stephanie Duclair
(74) *Attorney, Agent, or Firm* — Baker Botts L.L.P.

(57) ABSTRACT

In a plasma processing method of dry-etching of a magnetic film having a thickness of 200 nm to 500 nm, a plasma processing method of dry-etching of a sample having the magnetic film on which a multilayered film including a resist film, an non-organic film underlying the resist film, a Cr film underlying the non-organic film, and an $Al_2O_3$ film underlying the Cr film.

16 Claims, 4 Drawing Sheets

PLASMA PROCESSING METHOD

BACKGROUND OF THE INVENTION

The present invention relates to a plasma processing method and more particularly, to a method of etching a magnetic film.

In recent years, with a view to dealing with an increase in storage capacity of a hard disk drive, a used technology is shifting from the giant magneto resistive (GMR) to the tunneling magneto resistive (TMR) and its surface recording density is rapidly increasing. Accordingly, miniaturization of a magnetic head used for the hard disk drive has been required and a technique for fine pattern etching of the magnetic head has been demanded. Therefore, a dry etching apparatus is being used more than an ion milling apparatus for fabrication of the magnetic head.

A magnetic film constituting the magnetic head is made of a nonvolatile material such as NiFe, CoFe, or CoNiFe. But since the nonvolatile material has a very low volatility, which makes a high etching rate and a vertical profile not easily obtained, its fine pattern etching is difficult. Also, a reaction product created during etching will deposit on the inner wall of a processing chamber, often causing a change in time in etching performance to occur.

In order to realize fine pattern etching of the magnetic film made of the nonvolatile material with the current status of the dry etching technology as described above, various conditions such as etching gases and mask materials used in etching of magnetic films have been considered. For example, JP-A-2005-42143 discloses that using alcohol as etching gas for magnetic films high selectivities to mask materials can be obtained and JP-A-11-92971 discloses that $NH_3$ and CO are used as etching gas for magnetic film. In these methods, however, the etching rate is low to bring about poor productivity. Furthermore, since alcohol, $NH_3$, or CO are not used normally as the etching gas for the nonvolatile film, safety equipments such as leak detectors and hazard preventive equipments need to be newly facilitated for using these gases and additional costs would incur. For these reasons, in order to dry-etch a magnetic film of 100 nm or more with chlorine gas, which is normally used, as a primary gas, JPA-2010-49761 discloses a method in which dry etching of a magnetic film is carried out using a mask material having a boiling temperature of its chloride higher than that of a chloride of a magnetic film material.

More particularly, on a CoFe magnetic film having a thickness of about 250 nm, a mask of a multilayered film composed of an $Al_2O_3$ film 15, a Cr film 14, and a patterned resist film 11 is formed as shown in FIG. 2A. Initially, the Cr film 14 is etched with a mixture gas of chlorine and oxygen using the resist film 11 as a mask, the $Al_2O_3$ film 15 is etched subsequently with boron trichrolide gas, and finally, the CoFe Film is etched with a chlorine gas. In addition to $Al_2O_3$ and Cr, materials such as Ru, Mn, Pd, Y, Nd, Pr, Ce, La, $Y_2O_3$, $Nd_2O_3$, and $CeO_2$ can be enumerated as the mask material. But in dry-etching of the magnetic film with chlorine gas as a primary gas using the multilayered film of the above mask materials and the resist film 11, fine pattern etching in the vertical direction is difficult to achieve for the following reason. In conducting etching of the Cr film 14 using the mixture gas of chlorine and oxygen, the resist film 11 constituting the mask for the Cr film 14 has a principal component of carbon, which easily reacts with oxygen, and is therefore easily etched. Then, the resist film 11 is etched progressively in longitudinal and lateral directions as shown in solid line in FIG. 2B and the Cr film 14 is tapered in profile. This tapered profile of the etched Cr film affects etching profiles of underlying layers progressively and processing of the magnetic film into desired dimensions becomes difficult. For the purpose of etching the magnetic film of 200 to 500 nm at a high etching rate, using as the mask the multilayered film of $Al_2O_3$ film 15 and Cr film 14 which can have a high selectivity for the magnetic film as described in JP-A-2010-49761 is essential but with such mask of multilayered films, a excellent fine pattern etching profile is difficult to obtain as discussed above.

SUMMARY OF THE INVENTION

Accordingly, an objective of the present invention is to provide a dry-etching method which can etch a magnetic film of 200 to 500 nm thickness at a high etching rate while providing excellent fine pattern etching profiles.

In a plasma processing method of dry-etching a magnetic film having a thickness of 200 nm to 500 nm, there is provided in the present invention a plasma processing method of dry-etching a sample having the magnetic film on which a multilayered film including a resist film, an non-organic film underlying the resist film, a Cr film underlying the non-organic film, and an $Al_2O_3$ film underlying the Cr film.

According to the method of the present invention, the magnetic film of 200 to 500 nm thickness can be etched at a high etching rate and its fine pattern etching can be attained excellently.

Other objects, features and advantages of the invention will become apparent from the following description of the embodiments of the invention taken in conjunction with the accompanying drawings.

DESCRIPTION OF THE EMBODIMENTS

Figure 1:
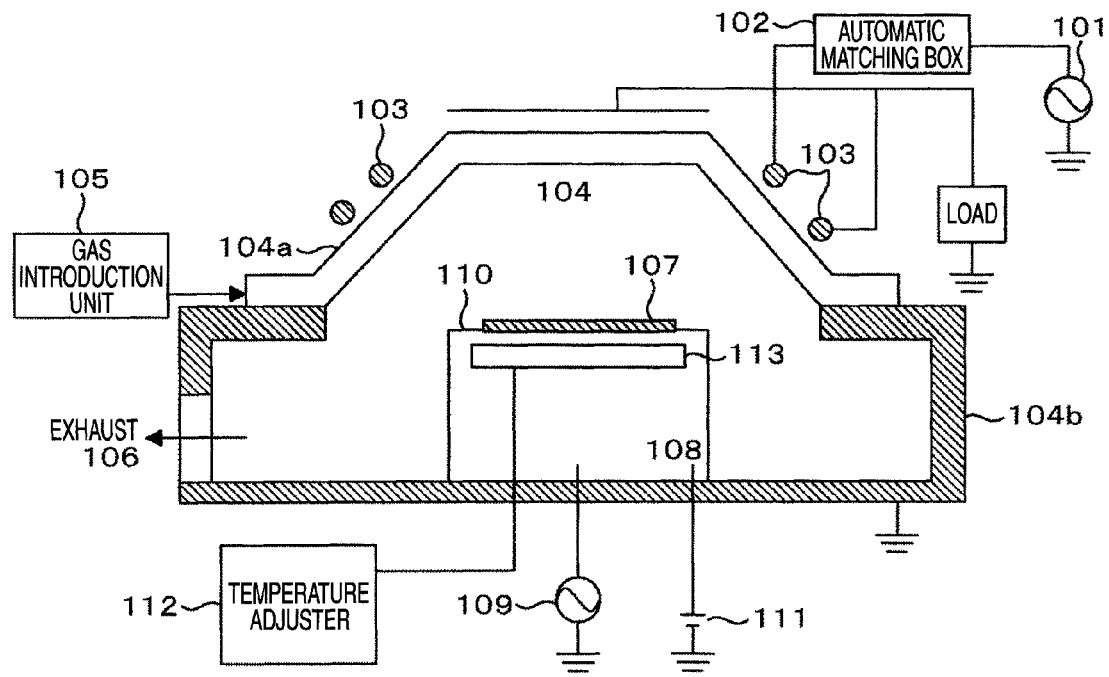
FIG. 1 is a longitudinal sectional diagram showing a plasma etching apparatus.
Figure 2A:
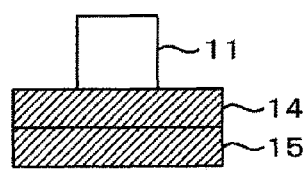
FIGS. 2A and 2B are diagrams showing a flow of etching of a magnetic film in the prior art.
Figure 2B:
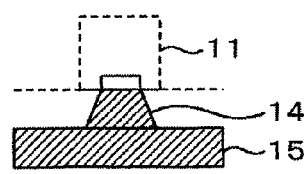

An embodiment of the present invention will now be described with reference to FIGS. 1 to 7. Firstly, a plasma etching apparatus for etching a magnetic film of the present invention will be described schematically by making reference to FIG. 1.

A first radio frequency power supply 101 for plasma generation provides radio frequency power to an inductive coupling coil 103 through an automatic matching box 102 and a gas for etching such as $Cl_2$ or $BCl_3$ is introduced to a vacuum chamber 104 through a gas introduction unit 105, thus generating plasma inside the vacuum chamber 104. It is to be noted that the aforementioned etching gas will be pumped out by means of a pumping unit 106. The vacuum chamber 104 includes an electric discharge section 104a made of dielectric material and a processing section 104b in which a sample stage 108 is arranged.

A sample 107 is mounted on the sample stage 108 connected with a bias power supply 109, which is a second radio frequency power supply, to accelerate ions incident on the sample 107. A ceramic member 110 is attached on the sample stage 108. The sample stage 108 is also connected with a DC power supply 111. The sample 107 is held on the surface of the sample stage 108 by Johnsen-Rahbek force.

Further, to control the temperature of the sample 107, the sample stage 108 is provided with a coolant channel 113 and by circulating a coolant adjusted for temperature from a temperature adjuster 112 in the channel 113, the temperature of the surface of the sample stage 108 is adjusted.

Next, with reference to FIGS. 3A to 3F, a plasma processing method will be described in which a magnetic, NiFe film 16 having a thickness of 200 to 500 nm is dry-etched using a multilayered film as a mask of non-organic films comprising a Ta film 13, a Cr film 14, and an $Al_2O_3$ film 15.

Figure 3A:
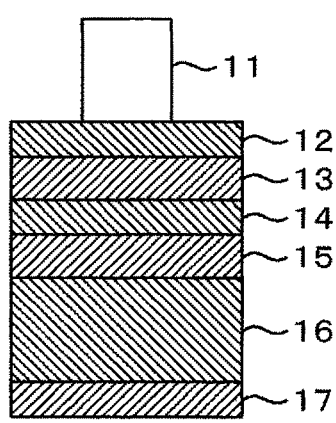
FIGS. 3A to 3F are diagrams showing a flow of etching of a magnetic film in the present invention.

FIG. 3A shows a cross section of the sample 107. The sample 107 is constituted by an AlTiC substrate formed of a multi-layer film having, sequentially from the top, a patterned resist film 11, a BARC film 12, the Ta film 13, the Cr film 14, the $Al_2O_3$ film 15, the NiFe film 16 as a member to be etched, and an undercoating stopper film 17 ($Al_2O_3$ film). The sample is for fabrication of a device of a magnetic head.

Figure 3B:
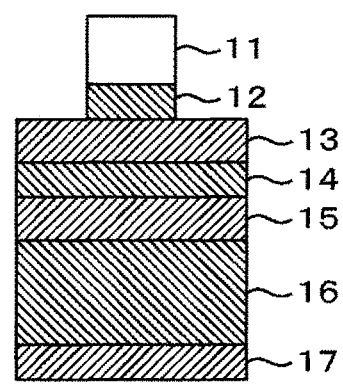

Next, a method of etching the BARC film 12 will be described with reference to FIGS. 3A and 3B.

The BARC film 12 is etched with a mixture gas containing $Cl_2$ gas and $O_2$ gas using the resist film 11 patterned in predetermined dimensions as a mask. Further, by adding to the above mixture gas $N_2$ gas for dimension control and Ar gas for process pressure adjustment and by making a flow rate of each of the $Cl_2$ gas, $O_2$ gas, $N_2$ gas, and Ar gas suitable, highly accurate control of machining dimensions becomes achievable. Also, by carrying out a trimming process during etching of the BARC film 12, control to an arbitrary width of machining dimensions can be facilitated and the machining dimensions within a range of 20 to 300 nm can be obtained. The trimming process referred to as above means making the dimensions of the resist film 11 and the BARC film 12 smaller in the dry-etching process than those of the resist film 11 at patterning.

Figure 3C:
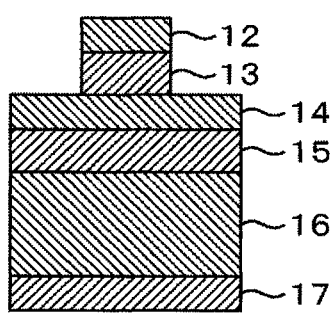

A method of etching the Ta film 13 will then be described with reference to FIGS. 3B and 3C.

The Ta film 13 is etched with a mixture gas containing $BCl_3$ gas and $Cl_2$ gas using the resist film 11 and the BARC film 12 as a mask.

Figure 3D:
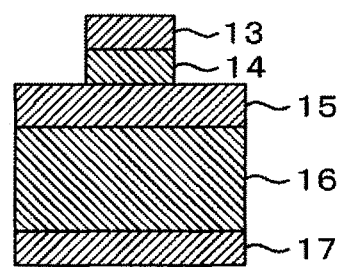

Subsequently, a method of etching the Cr film 14 will be described with reference to FIGS. 3C and 3D.

The Cr film 14 is etched with a mixture gas containing $Cl_2$ gas, $O_2$ gas, and Ar gas using the BARC film 12 and the Ta film 13 as a mask.

When etching of the Cr film 14 is conducted using the Ta film 13 as a mask with the mixture gas containing $Cl_2$ gas, $O_2$ gas, and Ar gas, etching of the Ta film 13 hardly proceeds and the Cr film 14 can be etched exactly to the mask dimensions of the Ta film 13. Consequently, the Cr film 14 can be machined vertically in just the mask dimensions as shown in FIG. 3D. Also, the selectivity of the Cr film 14 to the Ta film 13 amounts up to 10 or more and therefore, when the thickness of the Ta film 13 is 20 nm, it is possible for the Cr film 14 having a thickness amounting up to 200 nm to be etched. The selectivity of the Cr film 14 to the Ta film 13 means a ratio defined by dividing an etching rate of the Cr film 14 by that of the Ta film 13 (etching rate of the Cr film 14/etching rate of the Ta film 13).

The above-described method of etching the Cr film 14 is not limited to an instance of mask-machining where the member to be etched is a magnetic film as in the present embodiment but is also applicable to an instance where the Cr film 14 alternatively represents a member to be etched using a mixture gas containing $Cl_2$ gas, $O_2$ gas, and Ar gas. Further, in the present embodiment, the Ta film 13 is used as a mask when the Cr film 14 is etched using the mixture gas containing $Cl_2$ gas, $O_2$ gas, and Ar gas but even when a non-organic film such as TiN film, $SiO_2$ film, or SiC film is used as a mask, similar machining can be achieved to the case where the Ta film 13 is used because etching of the non-organic film with the mixture gas containing $Cl_2$ gas, $O_2$ gas, and Ar hardly proceeds.

Figure 3E:
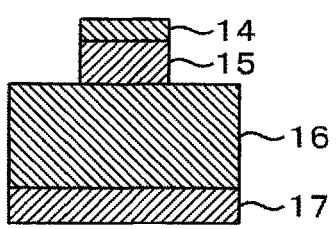

Next, a method of etching the $Al_2O_3$ film 15 will be described with reference to FIGS. 3D and 3E.

Figure 4:
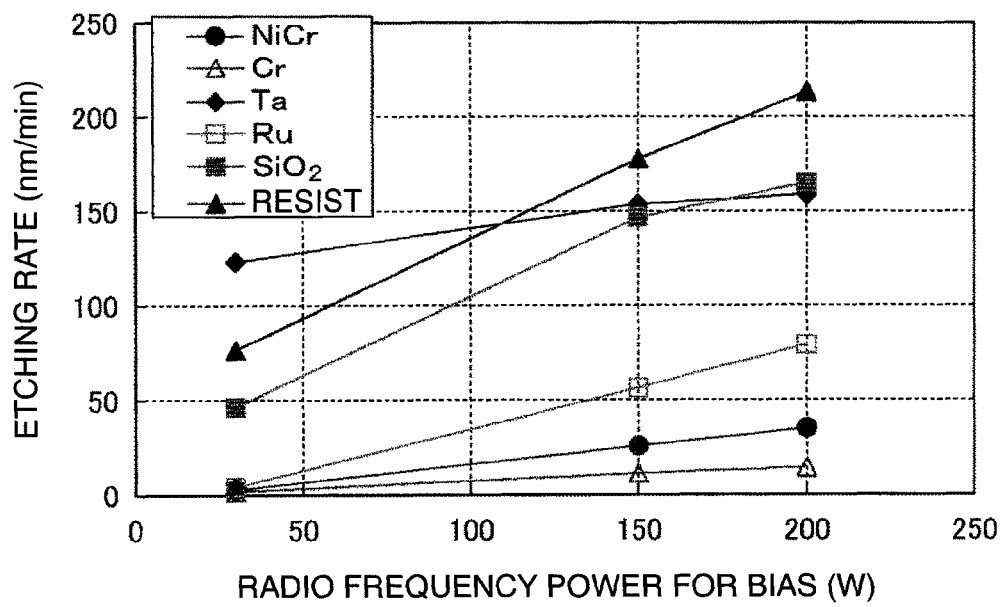
FIG. 4 is a graph showing etching rates of material candidates for a mask.

The $Al_2O_3$ film 15 is etched with a mixture gas containing $Cl_2$ gas and $BCl_3$ gas using as a mask the Ta film 13 and the Cr film 14. As seen in FIG. 4, which shows results of verification tests, a Cr film shows lower etching rates than, a NiCr film, a Ta film, a Ru film, a $SiO_2$ film, or a resist film, all of which are usually used as magnetic head materials. Therefore, the highest selectivity of the $Al_2O_3$ film 15 to the Cr film 14 can be obtained compared with those to the NiCr film, the Ta film 13, the Ru film, the $SiO_2$ film, and the resist film 11. Further, when, in etching of the $Al_2O_3$ film 15, the etching rate of the Cr film 14 acting as a mask is high, the amount of a reaction product created from the Cr film 14 increases and the reaction product will deposit on the side wall of $Al_2O_3$ film 15 which in turn tends to take a tapered profile. In the present embodiment, it was found that if the etching conditions are set so that the etching rate of the Cr film 14 may be 2 nm/min or less as shown in Table 1 or the selectivity of the $Al_2O_3$ film 15 to the Cr film 14 may be 12 or more, the amount of reaction product created from the Cr film 14 is lessened and, therefore, the $Al_2O_3$ film 15 can be machined vertically. Also, the present embodiment has been described by way of an example of etching of the $Al_2O_3$ film 15 with the mixture gas containing $Cl_2$ gas and $BCl_3$ gas but a gas containing at least $BCl_3$ gas may be used in place of the mixture gas containing $Cl_2$ gas and $BCl_3$ gas. The above-described method of etching $Al_2O_3$ film 15 is not limited to an instance of mask-machining where the member to be etched is a magnetic film as in the present embodiment but is also applicable to an instance where the $Al_2O_3$ film 15 alternatively represents a member to be etched using a mixture gas containing $Cl_2$ gas and $BCl_3$ gas or a gas containing at least $BCl_3$.

TABLE 1

| $BCl_3$ Gas (ml/min) | $Cl_2$ Gas | PROCESSING PRESSURE (Pa) | RADIO FREQUENCY POWER FOR PLASMA GENERATION (W) | RADIO FREQUENCY POWER FOR BIAS | TEMPERATURE OF TEMPERATURE ADJUSTER (° C.) |
|---|---|---|---|---|---|
| 100 | 40 | 0.4 | 1800 | 40 | 40 |

Figure 3F:
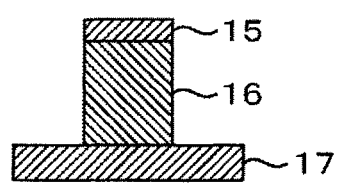

Next, a method of etching of the NiFe film 16 representing a magnetic film will be described with reference to FIGS. 3E and 3F.

The NiFe film 16 is etched with a $Cl_2$ gas or a mixture gas containing $Cl_2$ gas using the Cr film 14 and the $Al_2O_3$ film 15 as a mask. In the present embodiment, the etching was carried out at the conditions as shown in Table 2.

TABLE 2

| Cl$_2$ Gas (ml/min) | PROCESSING PRESSURE (Pa) | RADIO FREQUENCY POWER FOR PLASMA GENERATION (W) | RADIO FREQUENCY POWER FOR BIAS | TEMPERATURE OF TEMPERATURE ADJUSTER (°C.) |
|---|---|---|---|---|
| 140 | 0.4 | 1800 | 300 | 150 |

Figure 5:
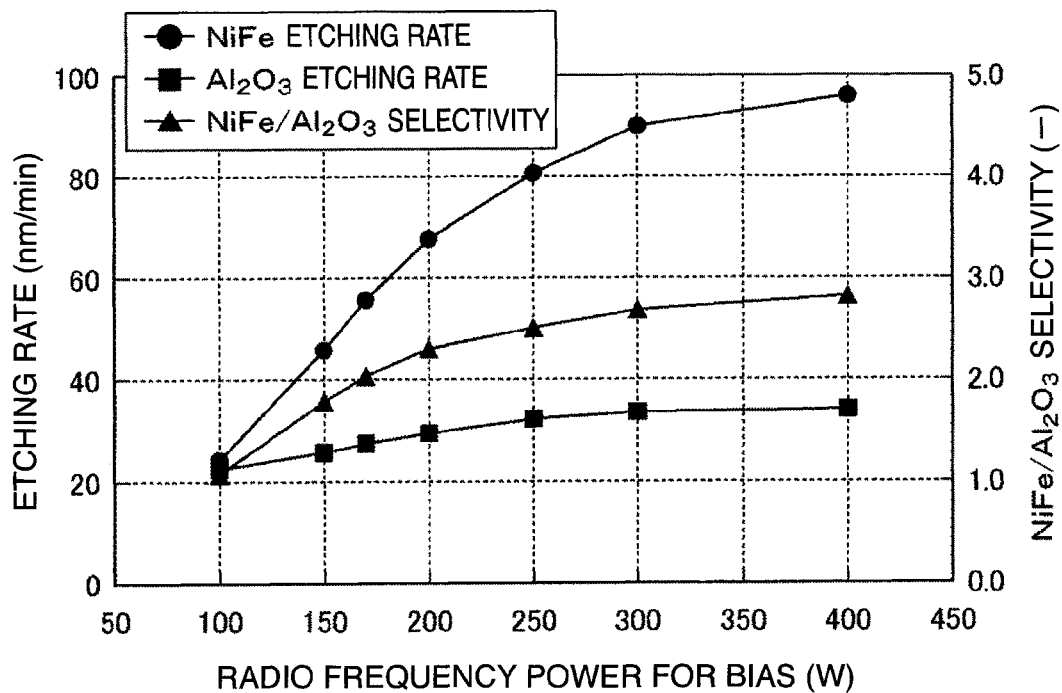
FIG. 5 is a graph showing the dependency of the selectivity of NiFe film to $Al_2O_3$ film upon the radio frequency power for bias.

The radio frequency power for bias in the present embodiment is 300 W but it may be 200 to 380 W. For the thickness of the NiFe film 16 being 500 nm, the thickness of Al$_2$O$_3$ film 15 needs to be 455 nm or more when the NiFe film 16 has a selectivity of 1.1 to the Al$_2$O$_3$ film 15. Generally, the etching rate is twice or higher at a shoulder portion of the mask than at its flat portion and the selectivity becomes half or less. Accordingly, the thickness of Al$_2$O$_3$ film 15 is required to be substantially 910 nm or more. But the Al$_2$O$_3$ film 15 having such a large thickness is difficult to form and, even if the formation of the film is possible, the aspect ratio increases and it becomes more difficult to machine the Al$_2$O$_3$ film 15 serving as a mask vertically. Under the circumstances, however, when the thickness of the Cr film 14 is 50 nm and the thickness of the Al$_2$O$_3$ film 15 is 250 nm, for example, a desired etching profile can be obtained in etching of the NiFe film 16 of 500 nm thickness, provided that the selectivity of the NiFe film 16 to the Al$_2$O$_3$ film 15 is 2.2 or greater. With the above in mind, to obtain a selectivity of 2.2 or greater, it is necessary for the radio frequency power for bias to be 200 W or more as shown in FIG. 5. As the radio frequency power for bias increases, the selectivity tends to increase; however, with the power being too high, the shoulder portion of mask is chipped so that the mask shape becomes tapered and, subsequently, the NiFe film 16 is chipped and tapered. Therefore, for suppression of the chipping of shoulder, the radio frequency power for bias is required to be 380 W or less.

The stage temperature is as high as 150° C. at the aforementioned etching conditions. Accordingly, while the surface temperature of the wafer is a room temperature of about 25° C. before the etching process, it rises as time elapses during the etching process.

In the present embodiment, the NiFe film 16 is used as a magnetic film but a CoFe film or a CoNiFe film may substitute for it.

The present embodiment is described as an instance where the BARC film 12, the Ta film 13, the Cr film 14, the Al$_2$O$_3$ film 15, and the NiFe film 16 are all etched consistently in the single etching processing chamber but the processes may be carried out using a plurality of etching processing chambers.

Next, an embodiment of the present invention where mask-machinings of the BARC film 12, the Ta film 13, the Cr film 14, and the Al$_2$O$_3$ film 15 are conducted in one etching processing chamber and etching of the NiFe film 16 with masks already machined is conducted in the other etching processing chamber will be described.

Figure 6:
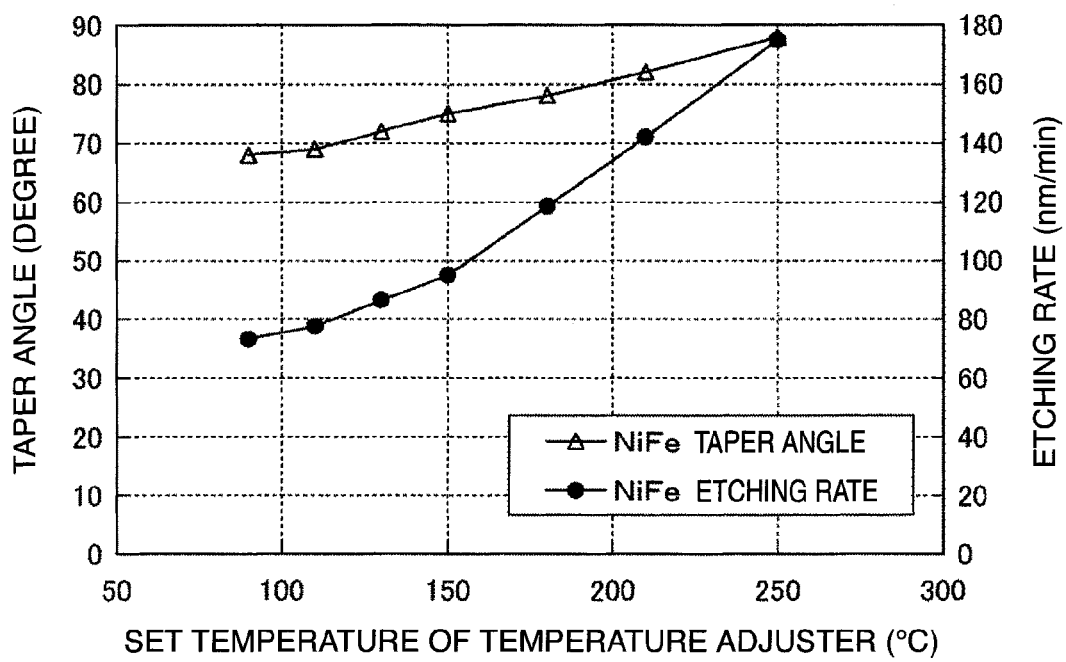
FIG. 6 is a graph showing the dependency of a taper angle of NiFe film upon set temperatures of a temperature adjuster.
Figure 7:
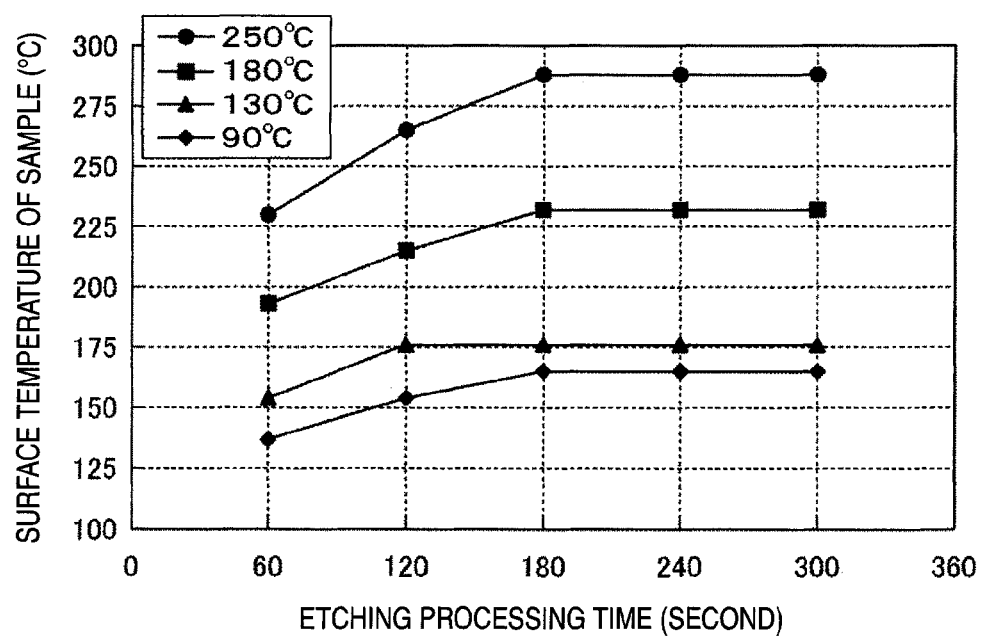
FIG. 7 is a graph showing the dependency of a surface temperature of a sample upon etching processing time.

The dependency of the taper angle of the NiFe film 16 upon the set temperature of temperature adjuster is shown in FIG. 6. The taper angle of the NiFe film 16 becomes closer to the right angle as the set temperature of the temperature adjuster increases and the taper angle of the NiFe film 16 amounts up to 88° at 250° C. On the other hand, the surface temperature of the sample 107 rises after the initiation of etching process as shown in FIG. 7 and does not saturate until at least 180 seconds has elapsed. Therefore, in order to obtain the vertical profile in the etching of the NiFe film 16, it is necessary that the temperature of temperature adjuster be set to 250° C. and the surface temperature of the sample 107 be stabilized within a short time. Moreover, shown in the caption of FIG. 7 is the temperature of the sample stage 108.

Therefore, in etching of the NiFe film 16 with an already machined mask, before starting the etching process of the NiFe Film 16, a plasma process with an inert gas such as Ar, He, or Xe, in which etching of the NiFe film 16 does not proceed, is added for 180 seconds during which the surface temperature of the sample 107 stabilizes. By virtue of addition of the plasma process with such an inert gas, an vertical profile can be obtained even when mask-machining of the BARC film 12, the Ta film 13, the Cr film 14, and the Al$_2$O$_3$ film 15 is conducted in one etching processing chamber and the NiFe film 16 with the machined mask is etched in another etching processing chamber.

Since in the present embodiment each of the BARC film 12, the Ta film 13, the Cr film 14, the Al$_2$O$_3$ film 15, and the NiFe film 16 is etched with Cl$_2$ gas as a primary gas, the inside of the etching processing chamber can be maintained in Cl$_2$ gas atmosphere and, consequently, the stable etching process with less temporal change can be attained.

Also, according to the present embodiment, a desired etching profile can be obtained in etching the magnetic film of 200 to 500 nm thickness and a dimensional width of 20 to 300 nm. In addition, all of the masks and the magnetic film can be processed by dry-etching so that the processing time can be shortened and the productivity can be improved.

The present embodiment of the plasma etching processing method of the present invention uses an induction coupling plasma etching apparatus but the present invention can also be applied to other apparatuses such as a microwave plasma etching processing apparatus, a UHF wave plasma etching processing apparatus, a helicon wave plasma etching processing apparatus and a two-frequency excitation parallel plate type plasma etching apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. In a plasma processing method of dry-etching a magnetic film having a thickness of 200 nm to 500 nm,
   said plasma processing method of dry-etching a sample having a multilayered film formed on said magnetic film, said multilayered film consisting of a resist film, a BARC film underlying the resist film, a Ta film, which is a separate film from the BARC film, underlying said BARC film, a Cr film underlying said Ta film, and an Al$_2$O$_3$ film underlying said Cr film,
   wherein the dry-etching of said sample comprises:
   dry-etching said BARC film using the resist film as a mask;
   dry-etching said Ta film using the resist film as a mask, and using the BARC film etched by the dry-etching of said BARC film as a mask;
   dry-etching said Cr film using the Ta film etched by the dry-etching of said Ta film as a mask;
   dry-etching said Al$_2$O$_3$ film using the Ta film etched by the dry-etching of said Ta film as a mask, and using the Cr film etched by the dry-etching of said Cr film as a mask;

dry-etching said magnetic film using the Cr film etched by the dry-etching of said Cr film as a mask, and using the Al$_2$O$_3$ film etched by the dry-etching of said Al$_2$O$_3$ film as a mask;

wherein the dry-etching of said magnetic film is performed using Cl$_2$ gas, wherein the dry-etching of said Al$_2$O$_3$ film is performed using a gas consisting of Cl$_2$ gas and BCl$_3$ gas, wherein the dry-etching of said Cr film is performed using a as consisting of Cl$_2$ gas, O$_2$ gas and Ar gas, wherein the dry-etching said Ta film is performed using a gas consisting Cl$_2$ gas and BCl$_3$, gas, and wherein the dry-etching of said BARC film is performed using a gas consisting of Cl$_2$ gas and O$_2$ gas.

2. The method of claim 1, wherein said magnetic film is any one of NiFe, CoFe and CoNiFe films.

3. The method of claim 1, wherein the magnetic film is a NiFe magnetic film.

4. The method of claim 1, wherein said Cr film is dry-etched using only the Ta film as a mask and the BARC film as a mask.

5. The method of claim 1, wherein said Cr film is dry-etched after the resist film has been removed.

6. The method of claim 1, wherein in said dry-etching of said Cr film, said BARC film is an uppermost film of the sample.

7. The method of claim 1, wherein the Ta film is directly in contact with the BARC film.

8. The method of claim 1, wherein the dry-etching of the Cr film provides an etched Cr film that has been etched vertically.

9. In a plasma processing method of dry-etching a magnetic film having a thickness of 200 nm to 500 nm, said plasma processing method of dry-etching a sample having a multilayered film formed on said magnetic film, said multilayered film consisting of a resist film, a BARC film underlying the resist film, a TiN film, which is a separate film from the BARC film, underlying said BARC film, a Cr film underlying said TiN film, and an Al2O3 film underlying said Cr film, wherein the dry-etching of said sample comprises:

dry-etching said BARC film using the resist film as a mask;

dry-etching said TiN film using the resist film as a mask, and using the BARC film etched by the dry-etching of said BARC film as a mask;

dry-etching said Cr film using the TiN film etched by the dry-etching of said TiN film as a mask;

dry-etching said Al$_2$O$_3$ film using the TiN film etched by the dry-etching of the TiN film as a mask, and using the Cr film etched by the dry-etching of said Cr film as a mask;

dry-etching said magnetic film using the Cr film etched by the dry-etching of the Cr film as a mask, and using the Al$_2$O$_3$ film etched by the dry-etching of said Al$_2$O$_3$ film as a mask;

wherein the dry-etching of said magnetic film is performed using Cl$_2$ gas, wherein the dry-etching of said Al$_2$O$_3$ film is performed using a gas consisting of Cl$_2$ gas and BCl$_3$ gas, wherein the dry-etching of said Cr film is performed using a gas consisting of Cl$_2$ gas, O$_2$ gas and Ar gas, wherein the dry-etching of said TiN film is performed using a gas consisting of Cl$_2$ gas and BCl$_3$ gas, and wherein the dry-etching of said BARC film is performed using a gas consisting of Cl$_2$ gas and O$_2$ gas.

10. The method of claim 9, wherein said Cr film is dry-etched using only the TiN film as a mask and the BARC film as a mask.

11. The method of claim 9, wherein said Cr film is dry-etched after the resist film has been removed.

12. The method of claim 9, wherein in said dry-etching of said Cr film, said BARC film is an uppermost film of the sample.

13. The method of claim 9, wherein the TiN film is directly in contact with the BARC film.

14. The method of claim 9, wherein said magnetic film is any one of NiFe, CoFe and CoNiFe films.

15. The method of claim 9, wherein the magnetic film is a NiFe magnetic film.

16. The method of claim 9, wherein the dry-etching of the Cr film provides an etched Cr film that has been etched vertically.

* * * * *